(12) United States Patent
Watters

(10) Patent No.: US 11,089,768 B2
(45) Date of Patent: Aug. 17, 2021

(54) COUNTER ROTATING SPINNER BLADE CLEVIS

(71) Applicant: Roger Watters, Freedom, WI (US)

(72) Inventor: Roger Watters, Freedom, WI (US)

( * ) Notice: Subject to any disclaimer, the term of this patent is extended or adjusted under 35 U.S.C. 154(b) by 231 days.

(21) Appl. No.: 16/501,086

(22) Filed: Feb. 21, 2019

(65) Prior Publication Data

US 2020/0267954 A1    Aug. 27, 2020

(51) Int. Cl.
     *A01K 85/12*      (2006.01)
     *A01K 85/10*      (2006.01)
     *A01K 85/14*      (2006.01)

(52) U.S. Cl.
     CPC ............ *A01K 85/12* (2013.01); *A01K 85/10* (2013.01); *A01K 85/14* (2013.01)

(58) Field of Classification Search
     CPC ......... A01K 85/10; A01K 85/12; A01K 85/14
     USPC ............. 43/42.11, 42.13, 42.14, 42.19, 42.2, 43/42.51, 44.9
     See application file for complete search history.

(56) References Cited

U.S. PATENT DOCUMENTS

| | | | | |
|---|---|---|---|---|
| 167,784 | A * | 9/1875 | Pierce ..................... | A01K 85/16 43/42.02 |
| 713,435 | A * | 11/1902 | Hildebrandt ........... | A01K 85/10 43/42.19 |
| 1,467,116 | A * | 9/1923 | Reekers ................. | A01K 85/10 43/42.19 |
| 2,486,635 | A * | 11/1949 | Coats ...................... | A01K 85/10 43/4 |
| 2,603,023 | A * | 7/1952 | Parish ..................... | A01K 85/10 43/42.19 |
| 2,618,830 | A * | 11/1952 | Boucher ................. | A01K 85/10 24/601.8 |
| 3,604,140 | A * | 9/1971 | Nelson .................... | A01K 85/10 43/42.13 |
| 3,672,086 | A * | 6/1972 | Terreni ................... | A01K 85/00 43/42.09 |
| 3,775,892 | A | 12/1973 | Bennetts | |
| 4,003,154 | A * | 1/1977 | Carver ................... | A01K 85/00 43/42.13 |
| 4,209,932 | A | 7/1980 | Pate | |
| 4,617,753 | A * | 10/1986 | Pauley ................... | A01K 85/10 43/42.09 |
| 4,823,501 | A | 4/1989 | Standish, Jr. | |
| 6,018,901 | A * | 2/2000 | DuBois .................. | A01K 85/00 43/42.13 |
| 6,173,521 | B1 | 1/2001 | Rockhill, Jr. | |

(Continued)

*Primary Examiner* — Lisa L Tsang
(74) *Attorney, Agent, or Firm* — D. L. Tschida

(57) ABSTRACT

A clevis body adapted to support one or a pair of spinner blades in combination on a filamentary support to produce a periodic cyclical counter rotation of the clevis and spinner blade assemblies when directed through water. A bore at a longitudinal core receives the filamentary support. At least one cross arm laterally radiates from the core and mounts to at least one spinner blade support arm that extends parallel to the core. One or a pair of spinner blades mounted to the longitudinal support arm(s) periodically and cyclically counter rotate the assembly about the filamentary support. The hydrodynamic movement of the clevis body and attached blades particularly induce the assembly to cyclically and periodically change back and forth between clockwise and counter-clockwise rotation directions.

20 Claims, 14 Drawing Sheets

(56) References Cited

U.S. PATENT DOCUMENTS 6,601,336 B1     8/2003   Link
2019/0116770 A1*   4/2019   Thompson ............. A01K 85/18

* cited by examiner

COUNTER ROTATING SPINNER BLADE CLEVIS

BACKGROUND OF THE INVENTION

The present invention relates to a clevis for supporting one or a pair of spinner blades to a filamentary support (e.g. formed wire lure piece, live bait harness, fishing line etc.) and wherein the clevis and blade(s) assembly produce a periodic counter rotating movement of the clevis and blades about the support as the assembly is directed through a body of water.

A variety of clevises have been constructed to facilitate the mounting of spinner blades of a variety of sizes and configurations (e.g. Colorado, Indiana, willow, Olympic, regal, hatchet etc.) to a filamentary support. Swivels have also been used to a similar end. The clevises can be formed from wire, stamped or cast from metal or molded from plastic or other moldable materials. Typically, a single blade is supported to each clevis.

Depending upon the fishing application, the clevis(s) can support a spinner blade to a formed wire lure support, live bait harness or a length of fish line. Multiple clevises and multiple blades can be mounted to a filamentary support. Some typically known metal clevis, swivel and blade mountings are disclosed at U.S. Pat. Nos. 4,209,932; 6,108,901; 6,173,521; and 6,601,336.

Some clevises are designed to permit mounting different blades to the clevis without detaching the clevis from a filamentary support. Examples of this type of clevis are shown at U.S. Pat. Nos. 2,603,023 and 4,617,753.

Clevis arrangements are also known where multiple clevises support multiple blades to a single lure support. Depending upon the curvature of the blade, the individual combinations of a single clevis and blade each independently and continuously rotate about the support in a defined direction (clockwise or counter clockwise). Another lure assembly shown at U.S. Pat. No. 4,823,501 provides a pair of blades mounted to separate arm supports and wherein each blade includes a cylindrical center body and from which vanes radially project that are shaped to simultaneously and continuously rotate independently of the other blade at the separate lure supports in opposite directions as the lure is maneuvered through the water.

In distinction to the foregoing known clevises and assemblies of multiple clevises or multiple blades at a single lure/device, the clevis of the present invention is adapted to support one or a pair of spinner blades from a single support or body piece to collectively rotate the clevis and attached blade(s) in unison about a filamentary support. However, in distinction to the known art, the direction of rotation of the clevis and attached blade(s) assembly of the invention cyclically switches the rotation direction. That is, the direction of the rotation of the clevis and blades cyclically changes between clockwise to counter clockwise and back to clockwise relative to the filamentary support. Presently, the rotation direction periodically changes approximately at the end of each full rotation of the clevis and attached blades about the filamentary support.

Specifically, the rotation direction changes from clockwise to counter clockwise and after a period of time changes from counter clockwise back to clockwise. The cyclical rotation change repeats so long as the blades are being retrieved through the water and blade movement is not obstructed with weeds or improper contact with the clevis etc. The unusual rotation changes provide a novel movement presentation to enhance the attractant qualities of the lure/device and enhance the numbers of fish caught.

SUMMARY OF THE INVENTION

It is a primary object of the invention to provide a clevis assembly having a clevis body piece adapted to support one or a pair of spinner blades and periodically produce a counter rotation of the clevis body piece and attached spinner blade(s) about a supporting filamentary support when directed through a body of water.

It is a further object of the invention in one configuration to provide a generally "H-shaped" clevis body piece having a bored longitudinal core piece and from left and right sides of which fore and aft displaced cross arms laterally radiate and which arms are adapted to support a pair of spinner blade support arms extending in gaps or spaces between the opposed lateral fore and aft cross arms.

It is a further object of the invention to provide a clevis body piece that exhibits a generally "H-shape" molded body piece having a longitudinal bore extending through a core piece coupled to one or more laterally projecting fore and aft cross arm pieces and wherein rigid spinner blade support arms longitudinally extend between/from the lateral fore and aft cross arm pieces.

It is a further object of the invention to provide a clevis body piece wherein first and second spinner blade support arms longitudinally extend adjacent to and slightly off-center from a longitudinally extending intermediate core piece having a longitudinal through bore.

It is a further object of the invention to provide a clevis body piece wherein first and second spinner blades are supported in first and second gaps or spaces between fore and aft cross arms that laterally radiate from a longitudinally extending core piece having a longitudinal through bore and wherein the width of the first gap is at least equal or greater than the width of the second gap and/or the gaps are longitudinally offset from each other.

It is a further object of the invention to provide a clevis body piece having a longitudinally extending core piece having a longitudinal through bore and first and second laterally displaced spinner blade support arm pieces that radiate from the body piece and wherein the lateral displacement of the first arm piece from the body is at least equal or greater than the displacement of the second arm piece from the body.

It is a further object of the invention to provide a clevis body piece having a longitudinal through bore and fore and aft spinner blade support arms mounted in through or closed-end holes or slots in fore and aft cross arms.

It is a further object of the invention to provide a clevis having a "T-shaped" body piece and an interconnecting "U-shaped" spinner blade support piece, wherein longitudinal spinner blade support arms of the blade support piece mount on opposite sides and longitudinally extend adjacent to a longitudinal core portion of the T-shaped body piece, which has a longitudinal through bore, and are captured to a lateral cross arm of the T-shaped body piece and the cross arm piece of the spinner blade support piece is captured to the longitudinal arm of the T-shaped body piece.

It is a further object of the invention to provide a clevis having a "U-shaped" spinner blade support piece wherein ends of parallel spinner blade support arms are captured to a core portion of a clevis body piece having a longitudinal through bore and a lateral cross piece of the spinner blade support piece is restrained in a cross channel of the longitudinal core portion of the clevis body piece.

It is a further object of the invention to provide a clevis having a "T-shaped" body piece having a longitudinal core or arm portion containing a longitudinal bore and intersecting right and left laterally radiating arm portions and wherein a wire formed frame is mounted to the core portion and supports a pair of spinner blades.

It is a further object of the invention to provide a clevis having a bored body piece and to which a "rectangular-shaped" frame is pivotally mounted and adapted to interchangeably support a pair of spinner blades.

It is a further object of the invention to provide a clevis having a bored core piece and to which a "rectangular-shaped" frame is pivotally mounted, wherein a pair of longitudinal frame arms longitudinally extend adjacent to the core piece, wherein fore and aft lateral frame cross arms detachably mount to the core piece, and wherein each longitudinal frame arm supports a spinner blade.

It is a further object of the invention to provide a wire formed clevis having a core piece including a longitudinal bore, wherein left and right spinner blade support arms extend longitudinally adjacent to the core piece, and wherein the spinner blade support arms are adapted to interchangeably support a pair of spinner blades.

It is a further object of the invention to provide a clevis that exhibits a generally "⊏-shaped" molded or wire formed body piece having a longitudinal bore extending through a longitudinal core piece, wherein a pair of longitudinally displaced, parallel, laterally projecting cross arm pieces extend from the core piece, and wherein a rigid spinner blade support arm extends between the lateral cross arm pieces and supports a single spinner blade.

The foregoing objects, advantages and distinctions of the inventive assemblies including a clevis body piece and one or more blade combinations or a lure including the foregoing assemblies are obtained in several following disclosed clevis assembly and lure constructions of the invention. A variety of alternative configurations and combinations of the disclosed features may also be arranged in still other clevis assemblies and lure constructions. Still other objects, advantages, distinctions, constructions an and combinations of individual features of the invention will become more apparent from the following description with respect to the appended drawings. Similar components and assemblies are referred to in the various drawings with similar alphanumeric reference characters. The description to each clevis and/or combination should not be literally construed in limitation of the invention. The invention should be interpreted within the broad scope of the further appended claims.

DESCRIPTION OF THE PREFERRED EMBODIMENTS

Figure 1:
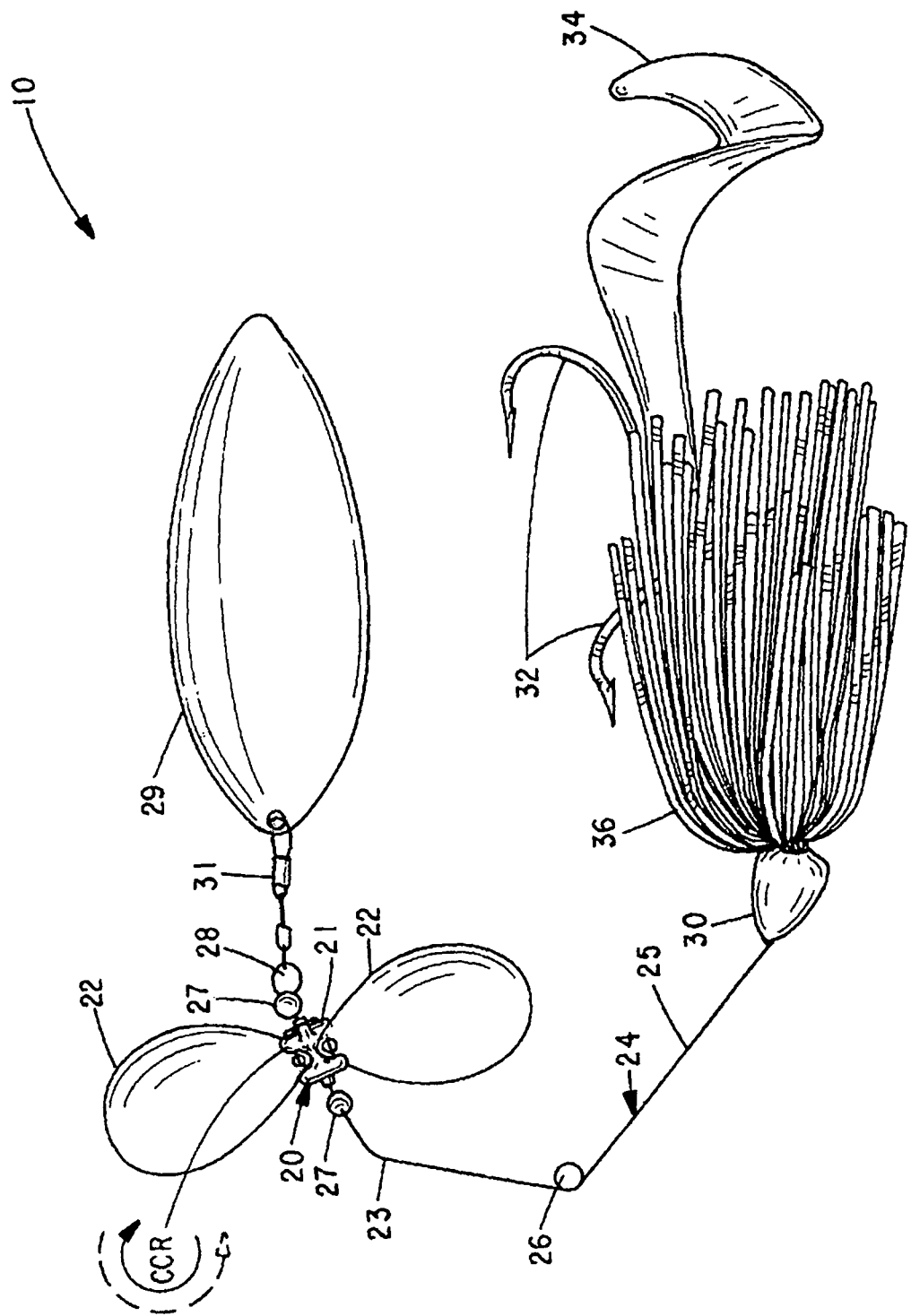
FIG. 1 shows a typical spinner bait fishing lure that has been modified to include the counter-rotating clevis and blade assembly of the invention mounted to a filamentary wire support arm and wherein the cyclical counter rotation (CCR) property of the clevis/blade assembly is denoted by the CCR callout surrounded by concentric, counter-directional solid line/dashed line arrows.
Figure 2:
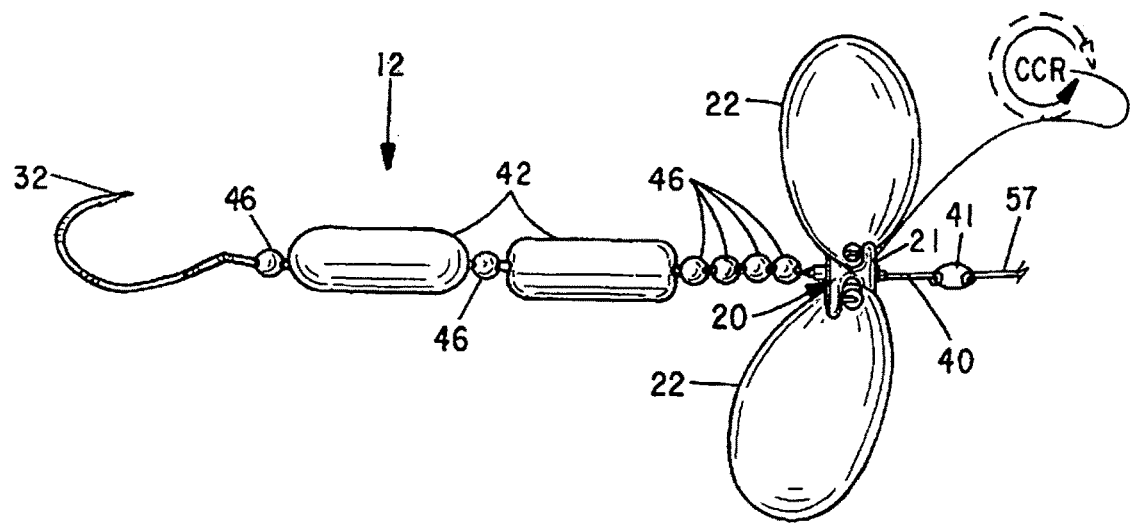
FIG. 2 shows a typical live bait spinner blade harness rig that has been modified to include the counter-rotating clevis and blade assembly of the invention mounted to a monofilament support arm and wherein the cyclical counter rotation (CCR) property of the clevis/blade assembly is denoted by the CCR callout surrounded by concentric, counter-directional solid line/dashed line arrows.
Figure 3:
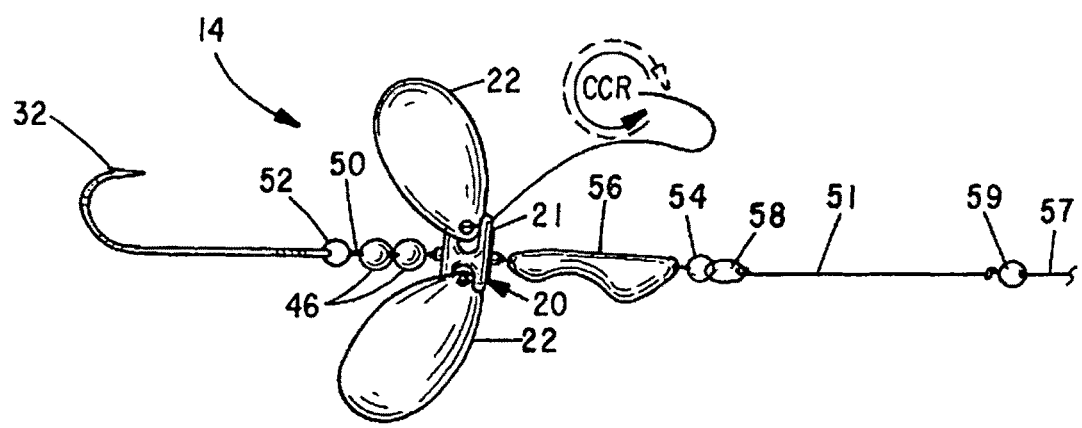
FIG. 3 shows a typical weight forward in-line spinner bait rig lure (such as used for walleye, musky and trout) that has been modified to include the counter-rotating clevis and blade assembly of the invention mounted to a filamentary wire support arm and wherein the cyclical counter rotation (CCR) property of the clevis/blade assembly is denoted by the CCR callout surrounded by concentric, counter-directional solid line/dashed line arrows.

With attention to the perspective view of FIGS. 1 through 3 and by way of exemplary applications of the novel clevis and spinner blade assembly 20 of the invention. Views are respectively shown to different lure assemblies containing the counter-rotating clevis and spinner blade assembly 20. FIG. 1 shows a wire-formed offset arm spinner bait fishing lure assembly 10 such as typically used for fishing freshwater bass and other species of fish. FIG. 2 shows a live bait harness-type spinner fishing lure assembly 12. FIG. 3 shows a weight forward-type, in-line spinner bait fishing lure assembly 14. Each of the lure assemblies 10, 12 and 14 has been adapted to include the counter-rotating clevis and spinner blade assembly 20 of the invention.

The counter-rotating clevis and spinner blade assembly 20 includes a clevis body piece 21 and at least one associated spinner blade 22. Most typically a pair of spinner blades 22 are mounted to the clevis body piece 21, although as discussed below a single spinner blade 22 can be mounted to an appropriately formed clevis body piece 202 and counter-rotate in similar fashion. The combination of the clevis body piece 21 and blades 22 when mounted to a filamentary support (e.g. wire or monofilament line) of the lure assemblies 10, 12 and 14 and drawn by an attached fishing line through water periodically counter-rotate in opposite directions in a cyclical fashion. That is, the assembly 20 rotates in one direction about the lure's filamentary support for a period of time and then switches the direction of rotation 180° for a similar period of time before reverting to the initial rotation direction.

The spinner blades 22 can be selected from a variety of different known configurations, for example, Colorado, Indiana, Oklahoma, French, willow, hatchet/tomahawk, kidney, turtleback and others. Preferably, any selected blade exhibits a "high lift" characteristic to facilitate counter rotation of the assembly 20. That is, the hydrodynamic movement of the blades 22 tend to lift and flare the blades 22 outward from the clevis body piece 21. Centrifugal and hydrodynamic forces are developed as the clevis body piece 21 and blades 22 rotate about the filamentary lure support that extends through the clevis body piece 21 to induce cyclical, periodic counter rotations thereof.

The size of the clevis body piece 21 and size and type of the spinner blades 22 are typically selected and matched to the lure type and configuration. Depending upon the lure type, Colorado and Indiana blades sizes from 6 to 12 have presently been found to perform the best with the clevis body and spinner blade assemblies discussed below, but other sizes and types and combinations of blades are believed to also perform in a similar counter-rotating fashion. Blades of differing sizes and types can be mounted to the clevis body piece 21 provided a sufficient disruption of the water is obtained to permit the assembly to counter rotate.

The spinner bait assembly 10 of FIG. 1 is typically used for fishing freshwater bass and musky and other relatively large species of fresh and salt water fish. The assembly 10 includes a filamentary, formed wire piece 24 having a spinner blade support arm 23 and a hook support arm 25. The wire form 24 is shaped to include an intermediate fish line attachment loop 26 and a distal end loop 28. A weighted head 30 is molded over the lower hook arm 25. A pair of fish hooks 32 trail behind the head 30. A typical plastic/rubber attractant tail 34 is secured to at least one of the hooks 32 and a typical rubber/silicone filamentary skirt 36 radially flares around the head 30.

The spinner blade arm 23 supports the clevis assembly 20 and included clevis body piece 21 and pair of spinner blades 22. Exemplary beads 27 separate the clevis body piece 21 from a trailing blade 29 secured to a swivel 31. Although one configuration of an offset-arm spinnerbait lure assembly 10 is shown, it is to be appreciated that such baits can take a variety of forms.

The live bait spinner rig lure assembly 12 of FIG. 2 is typically used for fishing walleye, bass, musky and other relatively large species of fresh water fish. The assembly 12 includes a filamentary support 40 (e.g. monofilament fish line, wire etc.) having a looped end 41 that attaches to a fish line 57. Secured to the support 40 are one or more hooks 32, a pair of flotation members 42, several bored beads 46, the clevis body piece 21 and a pair of spinner blades 22. The beads 46 and/or floats 42 are threaded to the support 40 and positioned to permit the clevis body piece 21 and spinner blades 22 free movement as they slide along and rotate about the support 40 and periodically change rotational direction.

The weight forward spinner bait lure assembly 14 of FIG. 3 is also typically used for fishing a variety of fresh and salt water fish. The assembly 14 includes a pair of linear formed wire pieces 50 and 51. The filamentary aft wire piece 50 includes an attachment loop 52 for a fish hook 32 and a distal end loop 54 is located forward of a molded, weighted head piece 56. Beads 46 separate the clevis body piece 21 and spinner blades 22 from the head piece 56 to again permit free movement of each relative to the wire piece 50.

The forward wire piece 51, which may or may not be provided in different constructions of weight forward spinner baits 14, includes loops 58 and 59 that allow the aft wire piece 50 of the assembly 14 to pivot relative to the forward wire piece 51 as the lure 14 is drawn through water via a fish line 57 secured to the forward loop 59. In other weighted lure configurations, a variety of filamentary plastic, fur, bucktail etc. attractant pieces can be arrayed at the lure assembly 14.

It is therefore to be appreciated that the clevis body piece and spinner blade assemblies 20 and the various alternative constructions thereof discussed herein can be adapted to any type of fishing lure presentation(s) wherein a spinner blade movement is desired. Advantageously, the presently mounted spinner blades 22 provide a uniquely different fish attracting action as the clevis body piece 21 and spinner blades 22 periodically change rotation direction relative to the filamentary support member.

Figure 4:
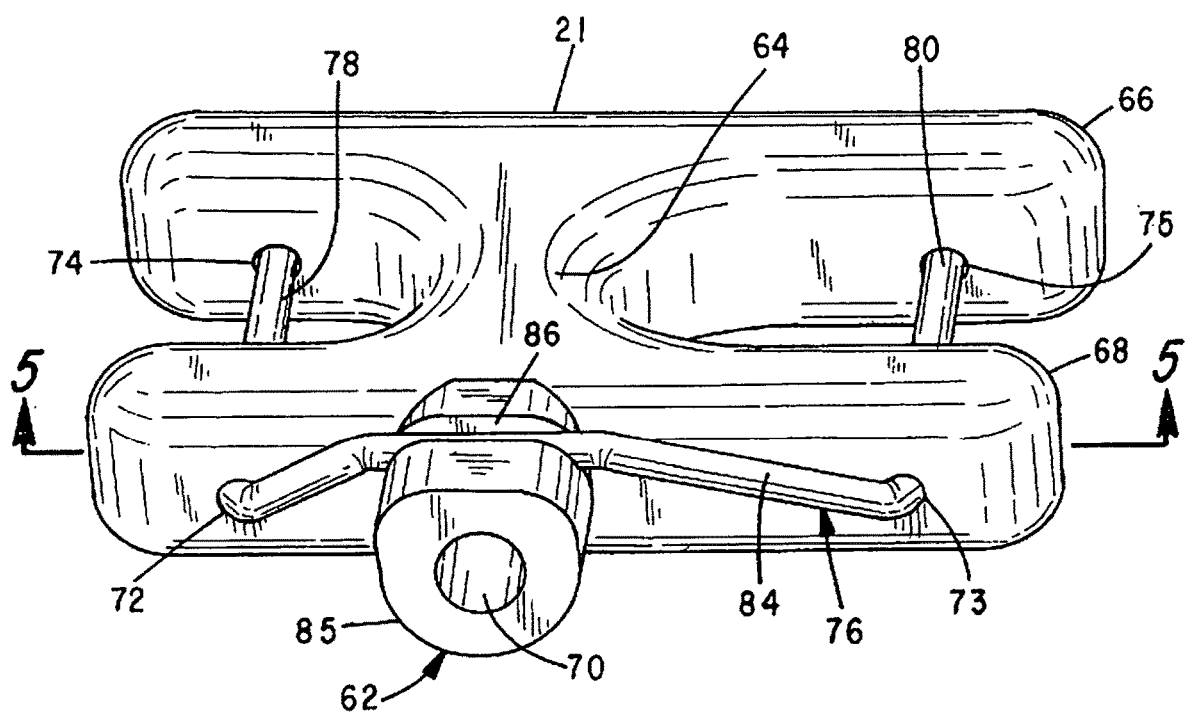
FIG. 4 shows a perspective view of the counter-rotating clevis of FIGS. 1-3 that exhibits a generally "H-shaped" molded body piece and depicted apart from the lure and with the spinner blade support arms mounted to the clevis body piece without the blades.
Figure 5:
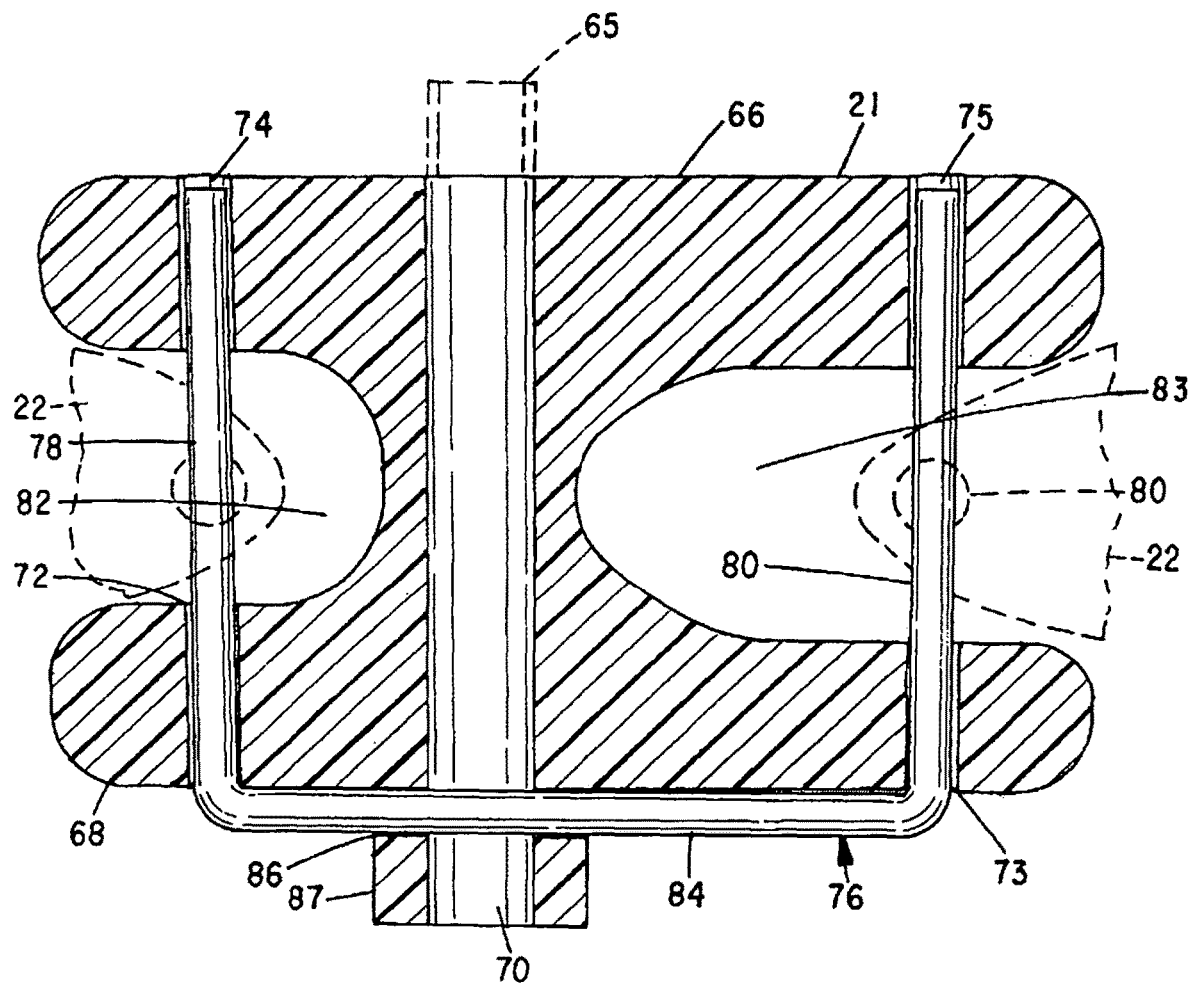
FIG. 5 shows a cross section plan view of the clevis body piece taken along section lines 5-5 of FIG. 4 with portions of the typically included spinner blades shown in dashed line.

Turning attention to FIGS. 4 and 5, a perspective and a cutaway plan view are shown to a generally "H-shaped" clevis body piece 21 relative to a filamentary support threaded through the clevis body piece 21 as shown when mounted to the lure assemblies 10, 12 and 14 of FIGS. 1-3. The clevis body piece 21 is formed as a unitary molded body 62 having a longitudinal core piece 64. Forward and aft cross arm pieces 66 and 68 laterally radiate from the core piece 64. The forward and aft cross arm pieces 66 and 68 are so denominated relative to the normal mounting and movement of the clevis body 62 through water.

The cross arms 66 and 68 laterally radiate from the core portion 64 of the molded body 62. A longitudinal bore 70 extends through the core 64 and through which the foregoing filamentary lure supports 23, 40 and 50 are threaded. A brass tube 65 (shown in dashed line at FIG. 5) can be molded or not into the core portion 64 to enhance the durability of the clevis 20. A bore 70 similarly extends through the tube piece 65, if used.

A pair of holes 72 and 73 extend through the left and right sides of the aft lateral cross arm 68 and align with holes 74 and 75 that can extend through or partially through the left and right sides of the forward cross arm 66. A U-shaped formed wire fastener 76 is supported to the clevis body piece 21. Left and right longitudinally extending arms 78 and 80 are supported in the aligned holes 72, 74 and 73,75 at the cross arms 66 and 68 arms. The spinner blades 22 are secured to the longitudinal arms 78 and 80 of the wire fastener 76 in left and right gaps or gap spaces 82, 83 between the fore and aft cross arms 66 and 68. The holes 72, 74 and 73, 75 are located approximately mid-way along the left and right portions of the cross arms 66 and 68 in the gap spaces 82, 83. The spinner blade support arms 78 and 80 longitudinally extend parallel to the bore 70 of the core piece 64. The spinner blade support arms 78 and 80, however, need not extend parallel to the core piece 64 or to each other provided the spinner blades are able to freely move about the support arms 78 and 80 in sufficiently disrupted water.

Figure 7:
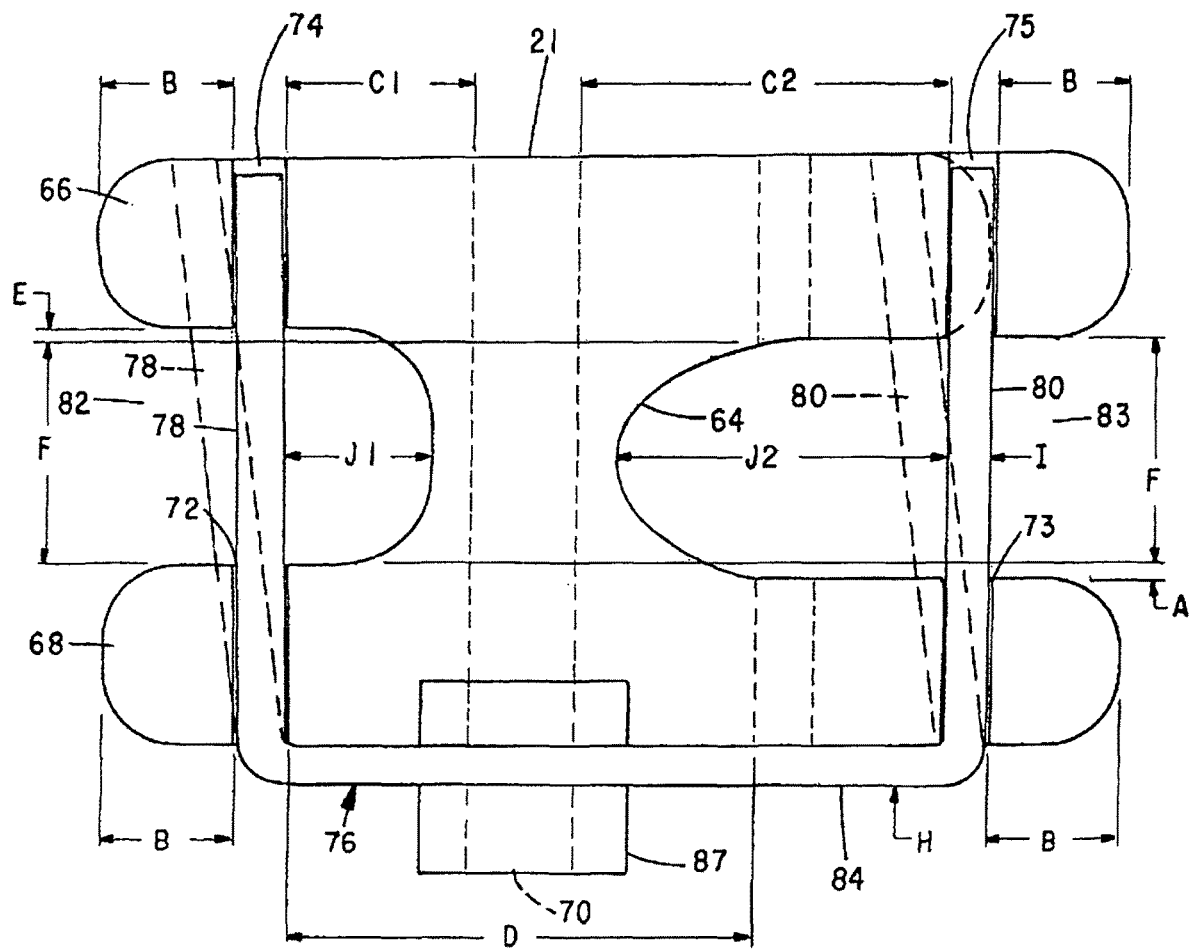
FIG. 7 shows a plan view similar to FIG. 5 wherein reference characters are directed to the relative positionings of the lateral cross arm holes 72, 74 and 73, 75, the widths and longitudinal offset of the gaps 82 and 83 between the right and left sides of the cross arms 66 and 68, and the relative lengths of the right and left sides of the fore and aft cross arms 66 and 68, along with an alternative arrangement of the fore and aft cross arms represented at the dashed line orientations of the spinner blade support arms and further depicted at FIG. 16 below.

The placement of the holes 72, 74 and 73, 75 and size of the gaps 82, 83, which are discussed further relative to FIG. 7, are molded to permit free and unobstructed movement of the spinner blades 22 about the longitudinal support arms 78 and 80 in the gaps 82 and 83. It is particularly preferable that the inner ends and hydrodynamic surfaces of each of the spinner blades 22 do not contact or adhere to the clevis body 62. Any disruption or obstruction of the movement of either spinner blade 22 can prevent the desired periodic counter rotation of the clevis body piece 20 and spinner blades 22.

The wire fastener 76 is preferably constructed from a high tensile, hardened wire of a diameter that permits free movement of the blades 22 as the blades 22 move in the gaps 82, 83 and as the molded clevis body 62 rotates about a filamentary lure support, such as the foregoing wire/monofilament lure supports 24, 40 and 50.

A shaped, lateral wire arm portion 84 of the fastener 76 extends parallel to the aft cross arm 68. The lateral arm portion 84 is bent to permit the lateral arm 84 to flex over a collar 85 of the core piece 64 that protrudes from the clevis body 62. The longitudinal arm portions 78 and 80 are fitted into the holes 72, 74 and 73, 75 and the lateral arm portion latches in a lateral groove 86 at the collar 85. The wire and bends of the lateral arm portion 84 are selected and formed to secure the fastener 76 under tension at the lateral groove 86 to the core piece 64. Although a wire formed fastener 76 is shown, the fastener 76 can be formed from other rigidly resilient materials. Rigid screws or pins might also be used alone as the longitudinal spinner blade support arms 78 and 80 in lieu of a flexible support arm fastener 76.

The fastener 76 and spinner blades 22 mounted along the longitudinal arm portions 78 and 80 in the gaps 82, 83 are thus constrained to the clevis body 62. The spinner blades 22 can be released by flexing the arm portion 84 up and away from the groove 86. The longitudinal support arm portions 78, 80 can then be withdrawn from the holes 72,74 and 73, 75. The size, type, color of the blades 22 can then be changed as desired.

Colorado, regal, Olympic and Indiana blades in nominal sizes 6 through 12 have demonstrated desirable rotation/counter rotation characteristics at the clevis assembly 20. Other sizes and combinations of sizes and types are also believed able to produce the desired cyclical counter rotation characteristics at the clevis/blade assemblies discussed herein. Normally paired sets of the same spinner blade type and size are mounted to the clevis body piece 21. However, mixed sizes and types of blades have also been observed to produce the desired cyclical counter rotation of the clevis assembly 20

It has been observed the period of rotation in each direction may vary depending upon the type and size of the blade(s) that are used. Most typically, however, the clevis body 21 and matched set of spinner blade(s) 22 tend to rotate 360° in one direction about the filamentary support before switching and rotating 360° in the opposite direction.

Figure 6:
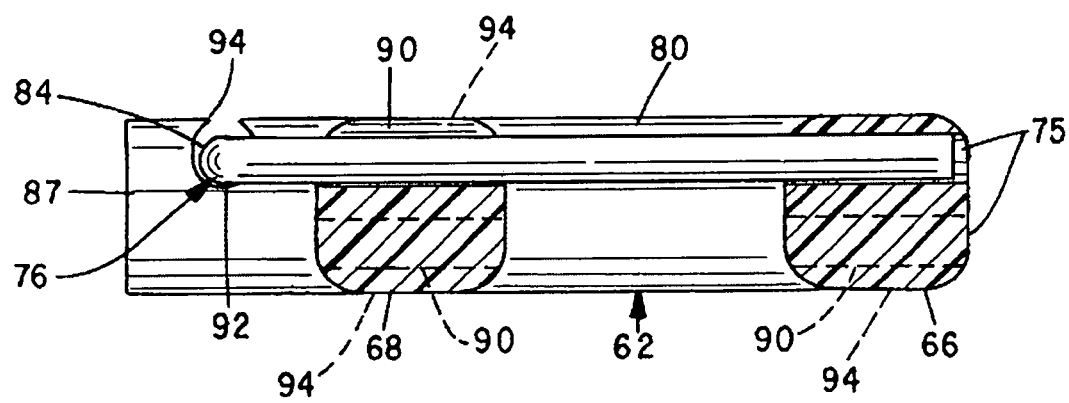
FIG. 6 shows a plan view of a counter-rotating clevis that exhibits a generally "H-shaped" molded body piece wherein the spinner blade support arms mount in cross channels versus holes in fore and aft lateral arms that radiate from the clevis body piece and snap mount in a lateral channel of a collar piece at a longitudinal core piece.

Attention is next directed to the side plan view of a modified clevis body 21 shown at FIG. 6. In particular, the aft cross arm 68 of the clevis body 62 is molded to provide longitudinal grooves 90 in the opposite lateral sides of the cross arm 68 in lieu of the holes 72 and 73. The groove 90 in the left side (shown in dashed line) is vertically offset or depressed from the groove 90 in the right side. The grooves 90 are symmetrically balanced vertically and laterally relative to the bore 70 at the core piece 64. The depth of the grooves 90 can be varied as desired. Whereas the longitudinal arms 78, 80 of the assembly of FIGS. 4 and 5 are arranged in a common horizontal plane relative to the bore 70 (when viewed end-on), the longitudinal arms 78, 80 of the assembly of FIG. 6 are located in a common plane rotated about the bore 70 (when viewed end-on).

A generally "U-shaped" fastener 76 is formed with appropriate bends in the arm portion 84 and mounts to a lateral channel 92 in a collar 87 without obstructing the longitudinal bore 70 (not shown). The opening 94 to the lateral channel 92 is molded slightly narrower than the lower cavity space of the channel 92. A resistance fit or snap mounting of the fastener 76 to the collar 87 is thus obtained.

Advantageously, the foregoing modified clevis body 62 and fastener 76 allows the spinner blades 22 to be mounted to the longitudinal arms 78 and 80 prior to fitting the ends of the longitudinal arms 78 and 80 into the holes 74 and 75 in the forward cross arm 66. As the ends of the spinner blade support arms 78 and 80 are inserted into the holes 74, 75, the spinner blades 22 are readily positioned in the gaps 82 and 83, prior to snapping the lateral arm portion 84 of the fastener 76 through the narrow width mouth 94 and into the lateral channel 92. The spinner blades 22 are thus more readily mounted and are restrained in a fashion that prevents detachment of the fastener 76 during normal use of the modified clevis body piece 20.

It is to be appreciated the fastener 76 can be constructed of a number of rigidly resilient materials. It is also to be appreciated the longitudinal grooves 90 can be modified to include narrowed resistance fit openings 94, such that the longitudinal spinner blade support arms 78, 80 are fastened to the clevis body 62 at the channels 90 alone and/or also at the lateral channel 92. In the latter instance, the arm portion 84 might also be deleted in preference to a pair of longitudinal support arms 78 and 80 that extend between the left and right portions of the fore and aft cross arms 66 and 68. The forward holes 74 and 75 might also be replaced with resistance fit grooves 90, 94. It is thus to be further appreciated that a variety of alternative combinations and arrangements of grooves 90, 92, holes and resistance fit openings 94 can be provided in the molded clevis body 62 to enhance the attachment of the fastener 76 and the mounting of the spinner blades 22 to the longitudinal support arms 78 and 80 to achieve the desired cyclical counter rotating attributes of the invention.

Turning attention to FIG. 7, a view of the clevis body piece 21 is shown that is similar to FIG. 5. Reference characters are however included to aspects of the clevis body 21 that are believed to facilitate the desirable counter rotating attributes imparted to the combination of the clevis body 21 and spinner blades 22 at the clevis assembly 20. A first characteristic is that preferably the lengths of the left and right portions of the fore and aft cross-arms 66, 68 that define the gaps 82 and 83 are such that C1+B≤C2+B. The length of the end portions B or other regions of the clevis body 21 can be equal but can vary from side to side and cross arm to cross arm. The thickness of the end portions B or other regions of the clevis body 21 can also be varied. The fore and aft cross arms 66 and 68 should be sufficiently long relative to the placement of the support arm holes 72, 74 and 73, 75 not to prevent or obstruct movement of the spinner blades 22 at the end portions B of the fore and aft cross arms 66 and 68. The end portion B of the cross arm 66 on the left or short side and right or long side can vary. The end portion B of the aft cross arm 68 on the right/long side must extend sufficiently to disrupt water flow. Similarly, the end portion B of the cross arm 208 of the clevis 202 shown at FIG. 15 must extend sufficiently to disrupt water flow, but not obstruct spinner blade movement.

The spacing of the holes 72, 74 and 73, 75 relative to the core piece 64 and bore 70 can be equal (i.e. J1=J2) but works best if J1<J2. Again, the end portions B otherwise should extend sufficiently and be shaped to facilitate the water flow relative to the spinner blades 22 to maintain constant blade movement. The spinner blade support arms 78 and 80 should also be straight and preferably mount in rigid relation to the clevis body 21.

Similarly, the edges of the vertical walls of the fore and aft cross arms 66 and 68 should be radiused to prevent the spinner blades 22 from hydrodynamically adhering to the molded body 62. The spacing J1 and J2 should also be sized to prevent the ends of the spinner blades 22 from hitting the core piece 64 or cross arms 66 and 68. The longitudinal spinner blade support arms 78 and 80 of the fastener 76 also preferably lie in the same plane as the bore 70.

The desired counter rotation attribute of the clevis body piece 21 can be further enhanced by longitudinally offsetting and/or increasing the width of the right arm gap 83 relative to the left arm gap 82. That is, the gap 82 (F+E) is narrower than the gap 83 (F+A) or F+E<F+A. The left side longitudinal offset E can be deleted as desired, but the longitudinal offset A of the right side is believed important to assure uninterrupted counter-rotation. The gaps 82 and 83 can also be made equal. The distance F in all cases must permit free, unobstructed movement of the spinner blade(s)22.

Figure 12:
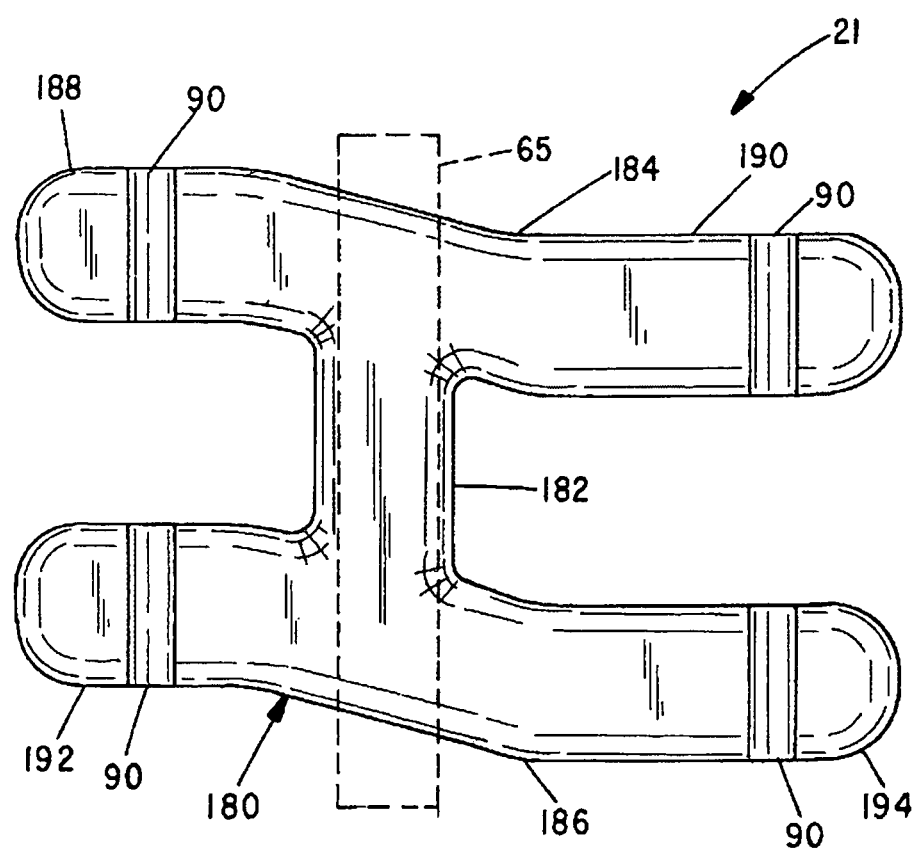
FIG. 12 shows a plan view of a counter-rotating clevis that exhibits a generally "H-shaped" molded body piece, wherein fore and aft cross arm pieces radially extend from a bored core piece, wherein left and right lateral arm segments of the cross arm pieces independently support spinner blade support arms (not shown), and wherein the fore and aft, left and right cross arm segments respectively project in parallel at differing lengths and are longitudinally offset from one another.

A molded clevis body 180 depicting the foregoing lateral and longitudinal offsets is depicted at FIG. 12. FIG. 12 particularly depicts a clevis body 180 having a bored longitudinal core piece 182 and from which forward and aft lateral arm pieces 184 and 186 radiate. Left and right portions 188, 190 and 192, 194 radially project in parallel from the core piece 182 with differing lateral and longitudinal offsets relative to the core piece 182. Spinner blade support arms (not shown) are supported to slots 90 or holes in the cross-arm portions 188, 190 and 192, 194.

Although a wire spinner blade support fastener 76 is presently preferred, pins or threaded fasteners with smooth shouldered portions can act as the spinner blade support arms 78 and 80 and mount in the gaps 82 and 83 between and through the holes 72, 74 and 73, 75. Longitudinal blade support arms 78 and 80 constructed of monofilament fibers or other stiff plastic rod stock material can also be secured between the holes 72, 74 and 73, 75. In all instances any blade support arm 78 and/or 80 should be straight and permit free longitudinal and rotational movement of the spinner blades 22 relative to and along the spinner blade support arms 78 and 80 without being hindered by the adjoining core or cross arm pieces.

Figure 16:
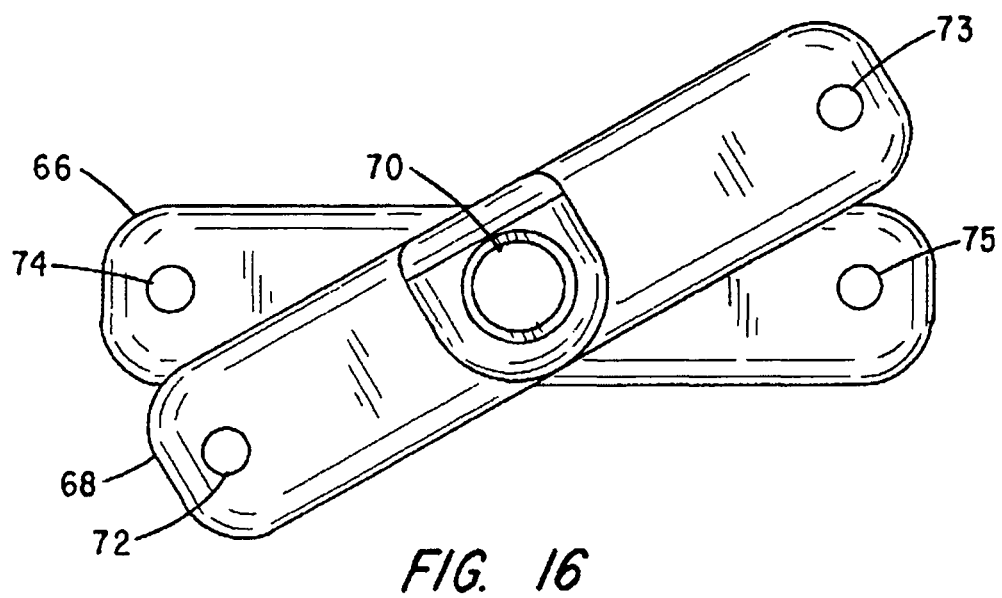
FIG. 16 shows a top view of a counter-rotating clevis of the type depicted in FIGS. 1-3 wherein the fore and aft cross arms of the molded body piece are rotated relative to each other about the interconnecting core piece and wherein the rotated orientation is further depicted at the dashed line orientations of the spinner blade support arms of FIG. 7.

It is also to be appreciated that molded body of the clevis piece 21 might be constructed in the form of overlapping halves or other overlapping configurations. The overlapping body portions can be designed to interconnect and capture the spinner blade support arm pieces to the molded body in lieu of or in combination with holes and/or slots in fashions such as described herein. It is to be further appreciated the fore and aft cross arms 66 and 68 in lieu of being co-planar with the spinner blade support arms 78 and 80 can be rotated relative to each other as depicted by the dashed line representations thereof and as further shown for example at FIG. 16.

Figure 8:
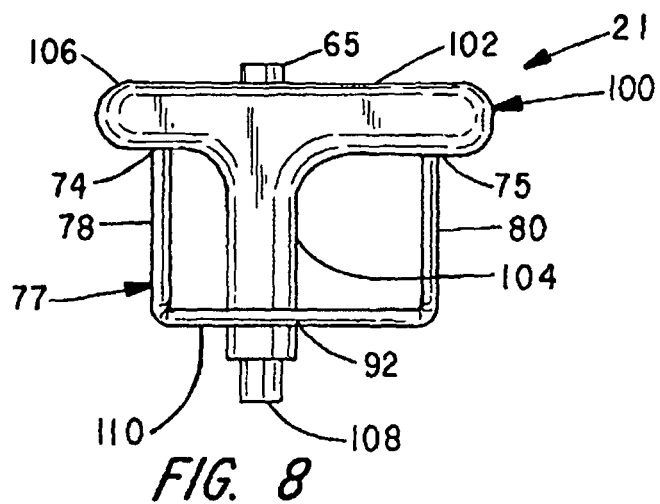
FIG. 8 shows a plan view of an alternative embodiment of a counter-rotating clevis having a "T-shaped" body piece and to which a "U-shaped" wire-formed spinner blade support arm frame is mounted.

Turning attention to FIG. 8 an alternative construction of a clevis piece 100 is shown. The clevis piece 100 provides a "T-shaped" molded body 102 having a longitudinal core portion 104 and from which a forward cross arm 106 laterally radiates. A longitudinal tubular sleeve 65 is molded into the core portion 104 and extends through the core portion 104. The sleeve 65 provides an open-ended through bore 108 for receiving a filamentary support. Left and right ends of a "U-shaped" wire fastener 77 are secured to the molded clevis body 102 at longitudinal holes 74 and 75 in the ends of the forward cross arm 106. A lateral cross arm portion 110 of the fastener 77 snap mounts in a resistance channel 92 formed into the aft end of the core portion 104. The bends between the spinner blade support arm portions 78 and 80 relative to the lateral portion 110 are shaped to assure unobstructed movement of any attached spinner blades 22 and prevent the spinner blades 22 from sliding onto the lateral portion 110. The length and longitudinal offset of the spinner blade support arm portions 78 and 80 can also be varied as desired to obtain the desired counter rotation of the clevis body piece 100 and spinner blades 22.

Figure 9:
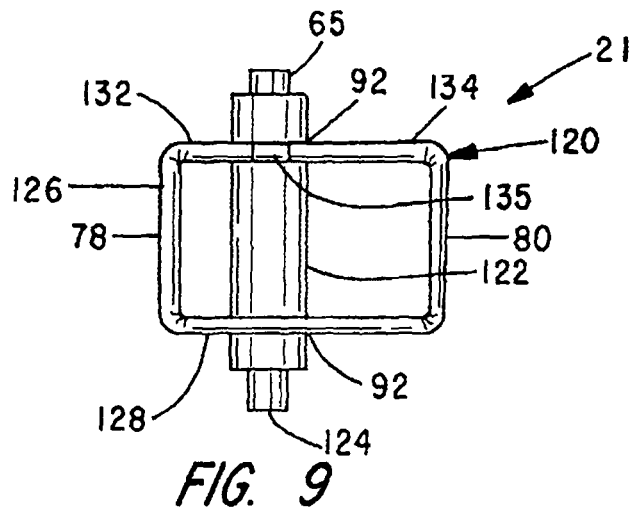
FIG. 9 shows a plan view of another alternative embodiment of a counter-rotating clevis having a bored cylindrical core body piece and to which a wire-formed "rectangular-shaped" spinner blade support arm frame is pivotally mounted.

FIG. 9 depicts still another alternative construction of a clevis body piece 120. Secured to the clevis body piece 120 is a "rectangular-shaped" spinner blade fastener 126. A molded core piece 122 supports a longitudinal tubular sleeve 65 molded into the core piece 122. A bore 124 extends through the sleeve 65 to receive a filamentary lure support. The "rectangular-shaped" wire fastener 126 is secured to the core piece 122 at the fore and aft ends of the core piece 122 at snap-acting resistance channels 92. Left and right longitudinal spinner blade support arms 78, 80 of the spinner blade fastener 126 support attached spinner blades 22 (not shown).

A lateral cross arm portion 128 of the fastener 126 snap mounts in a resistance channel 92 formed into the aft end of the core piece 122. The left and right forward cross arm pieces 132 and 134 of the fastener 126 are formed to provide a separation 135 but still permit the ends to mount and attach to the core portion 122 at a forward snap-acting resistance channel 92.

Upon securing the lateral arm portion 128 to the aft end of the core portion 122, the separation 135 permits the mounting of appropriate spinner blades 22 over the ends of left and right side forward cross arm pieces 132 and 134. The left and right side forward cross arm pieces 132 and 134 are then be rotated and snapped into the forward channel 92. The bends between the spinner blade support arm portions 78 and 80 relative to the longitudinal core piece 122 and left and right side forward cross arms 132 and 134 are shaped to assure unobstructed movement of any attached spinner blades 22 and prevent the spinner blades 22 from sliding onto the lateral arm portion 128. The length and lateral offset of the spinner blade support arm portions 78 and 80 from the core portion 122 can be varied as desired to obtain the desired counter rotation of the clevis body piece 120 and spinner blades 22.

Figure 10:
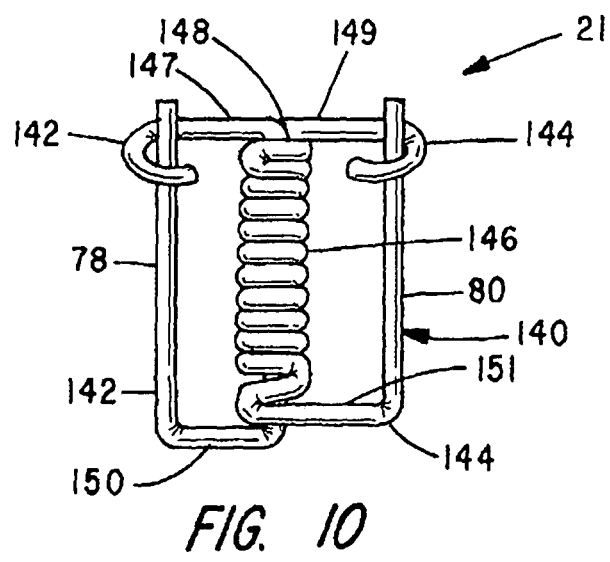
FIG. 10 shows a plan view of another alternative embodiment of a wire formed, counter-rotating clevis having a bore containing cylindrical core body, wherein fore and aft cross arm pieces laterally radiate from the core piece, piece, wherein left and right spinner blade support arms longitudinally extend in parallel with the core body piece, and wherein the support arms are detachably secured to bent end portions of the cross arm pieces.

FIG. 10 depicts still another alternative construction of a clevis body piece 140. The clevis body piece 140 is formed from a pair of tensile wires 142 and 144 that are twisted to the depicted shape. Latch ends 142 and 144 are formed into the wires 142 and 144. The wires 142 and 144 are twisted to form a central spiral core portion 146 having a central bore 148. The aft ends of the wires 142 and 144 are formed to provide longitudinal spinner blade support arms 78 and 80. The left and right longitudinal spinner blade support arm portions 78 and 80 contain appropriately selected spinner blades 22. Again, it is to be appreciated the bends between the longitudinal spinner blade support arm portions 78 and 80 relative to the left and right lateral forward cross arm portions 147, 149 and left and right aft lateral arm portions 150, 151 are shaped to assure unobstructed movement of any attached spinner blades 22 and prevent the spinner blades 22 from sliding onto the lateral cross arm portions 150 and 151. The length and lateral and longitudinal offset of the spinner blade support arm portions 78 and 80 from the core portion 146 can also be varied as desired to obtain the desired counter rotation of the clevis body piece 140 and spinner blades 22.

Figure 11:
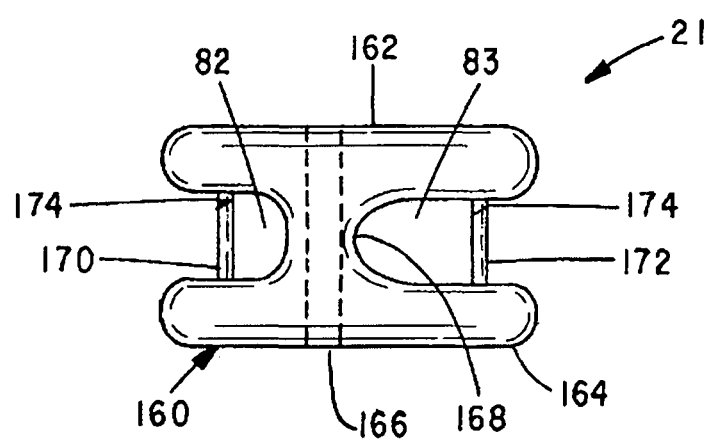
FIG. 11 shows a plan view of another alternative embodiment of a counter-rotating clevis having resilient longitudinal spinner blade support arms laterally displaced from a longitudinal bore and that include slits and wherein the slits are able to flex apart to receive and interchangeably support preferred spinner blades at each longitudinal support arm.

FIG. 11 depicts still another alternative construction of a clevis body piece 160. The clevis body piece 160 is molded body to provide a core portion 168. An open-ended bore 166 extends through the core portion 168. Fore and aft cross arms 162 and 164 laterally radiate from the core portion 168. Left and right longitudinal spinner blade support arms 170 and 172 extend between the left and right sides of the forward and aft cross arms 162 and 164. Each arm 170 and 172 is constructed to flex apart to permit selective mounting of associated spinner blades 22. A flexible notch, slit or the like 174 is provided at each support arm allows the support arms 170 and 172 to flex apart at the slits 17 to receive a spinner blade 22 before flexing back to shape. The spinner blade support arms 170 and 172 generally return to define generally straight, rigid arms. With lure movement the spinner blades 22 typically slide to the aft ends of the support arms 170 and 172 and are able to freely move about the arms 170 and 172 at the clevis 140 as with any of the other clevis body pieces disclosed herein. The length and lateral and longitudinal offset of the arm portions 170 and 180 relative to the core portion 168 can also be varied as desired to obtain a desired counter rotation of the clevis body piece 160 and spinner blades 22 at a filamentary support. Similarly, the width of the gaps between the cross arms 162 and 164 and longitudinal offset can also be varied as desired to obtain the desired counter rotation of the clevis 160 and spinner blades 22.

Figure 13:
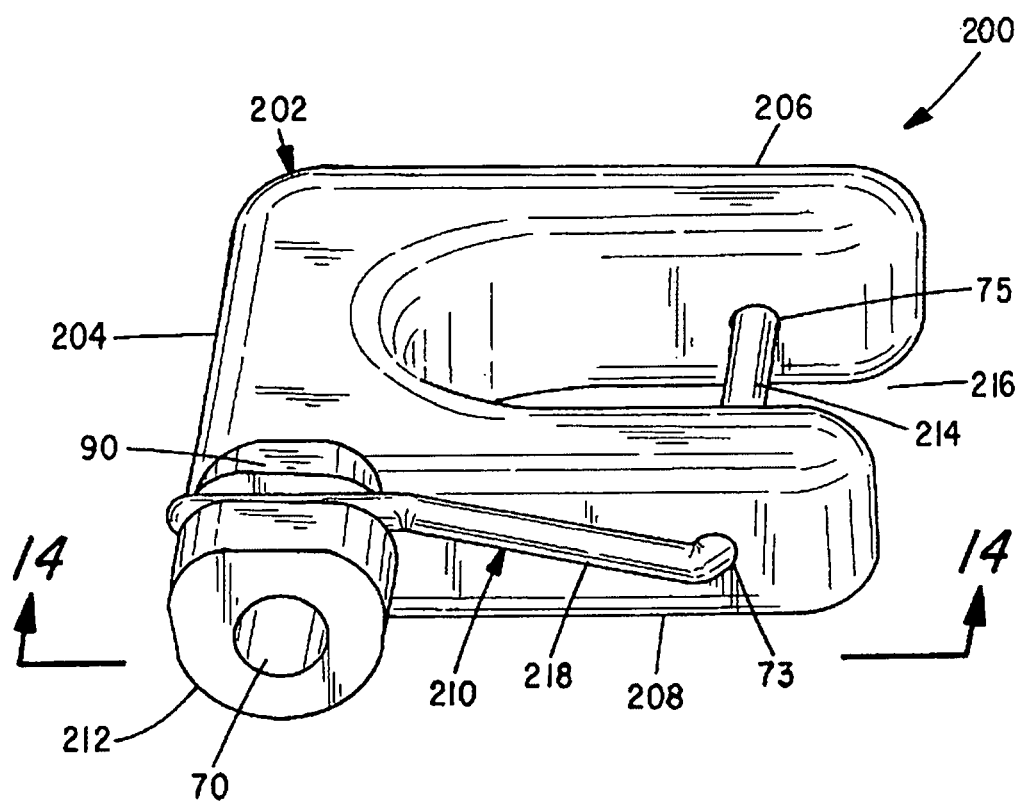
FIG. 13 shows a perspective view of a counter-rotating clevis body piece constructed to support a single spinner blade, wherein the body piece exhibits a generally "⊂-shape", wherein a longitudinal bore extends through a longitudinal core piece, wherein fore and aft cross arm pieces laterally radiate in parallel from the core piece, and wherein a single spinner blade support arm extends between the fore and aft cross arm pieces in parallel with the bore of the core piece.
Figure 14:
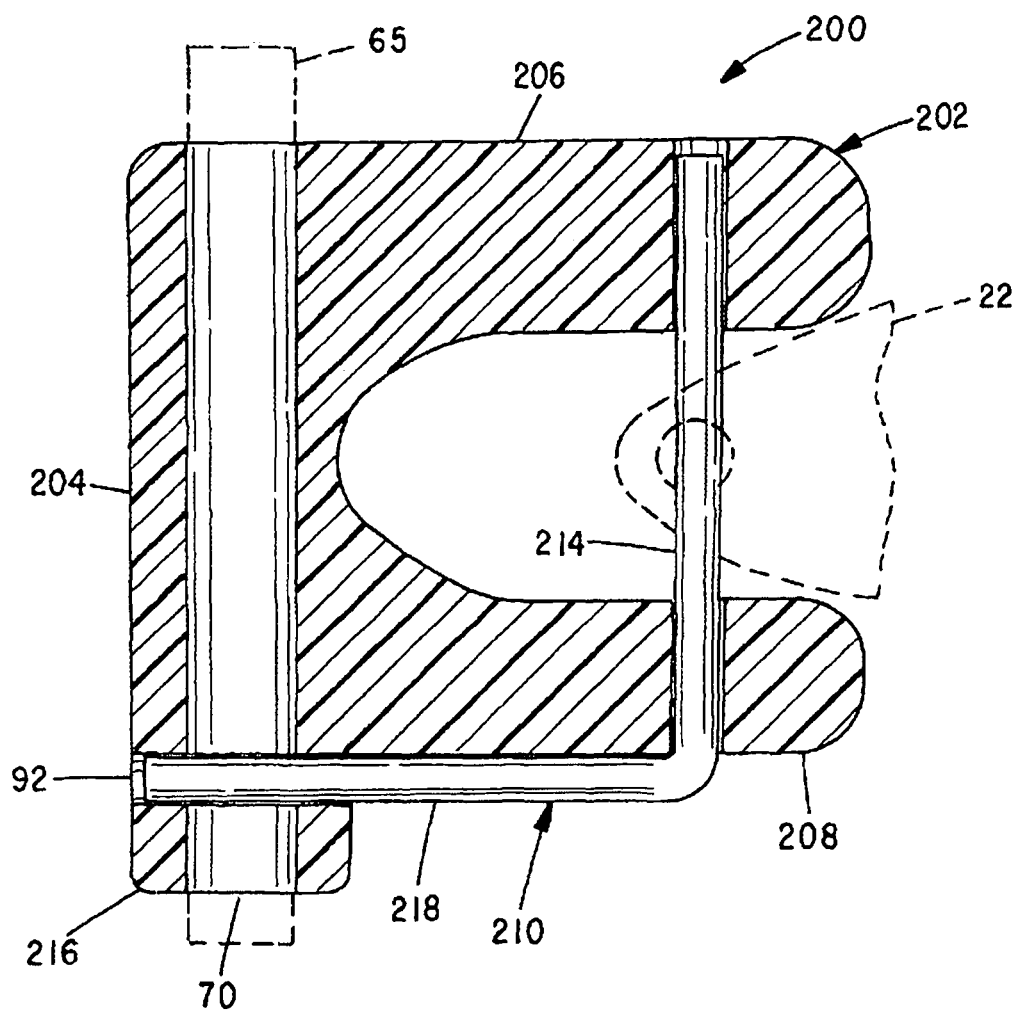
FIG. 14 shows a cross section plan view of the clevis body piece taken along section lines 14-14 of FIG. 13 with a portion of a typically included single spinner blade shown in dashed line.
Figure 15:
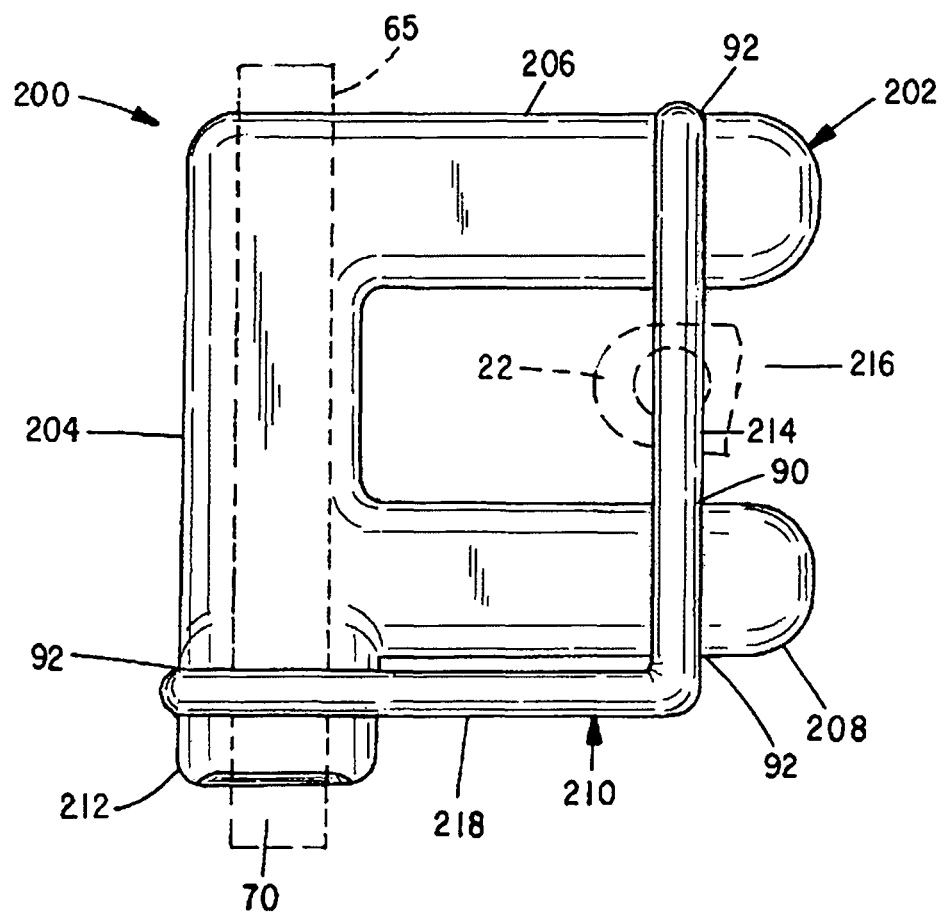
FIG. 15 shows a plan view of a single blade clevis body piece similar to FIG. 12 with the spinner blade support arm mounted in resistance fit grooves formed into the ends of the fore and aft cross arms.

Each of the foregoing clevis assemblies 20 require two spinner blades to achieve the desired counter-rotation of the assemblies 20. However, upon testing of the foregoing clevis assemblies 20, it has also been determined that it is possible to produce the unusual cyclical counter rotation properties of the disclosed clevis and spinner blade assemblies 20 in a clevis assembly 200 that supports a single spinner blade 22. FIGS. 13 through 15 depict constructions of a single blade assembly 200 and which includes a generally "⊂-shape" clevis body piece 20. The assembly 200 of FIG. 15 is slightly modified from the assembly 200 of FIGS. 13 and 14 as discussed below.

A "⊂-shaped" molded body 202 of the assembly 200 includes a longitudinal core portion 204 having a longitudinal bore 70. As before, the core portion 204 can support a tubular sleeve 65. Fore and aft cross arm portions 206 and 208 laterally radiate in parallel from the core portion 204. A spinner blade support fastener 210 mounts to a resistance fit slot 90 at a collar piece 212 that extends from the core portion 204. A spinner blade support arm portion 214 of the fastener 210 mounts in holes 73 and 75 in ends of the cross-arm portions 206 and 208.

The longitudinal spinner blade support arm portion 214 of the fastener 210 extends in a gap 216 between the cross-arm portions 206 and 208. An aft cross-arm portion 218 of the fastener 210 parallels the aft cross arm body portion 208 and snap mounts to the slot 90 at the collar piece 212.

In distinction to the clevis body piece 202 of FIGS. 13 and 14, the spinner blade support arm 214 of the clevis body 202 of FIG. 15 mounts in resistance fit slots 92 at each of the core and cross arm portions 204, 206 and 208.

The foregoing single blade clevis/blade assemblies 200 have been found to produce the desirable cyclical counter rotation properties with several different types and sizes of spinner blades 22. Advantageously the foregoing single blade clevis/spinner blade assembly 200 facilitates the use of the invention with smaller lure presentations versus the larger two spinner blade/clevis assemblies 20.

Figure 17:
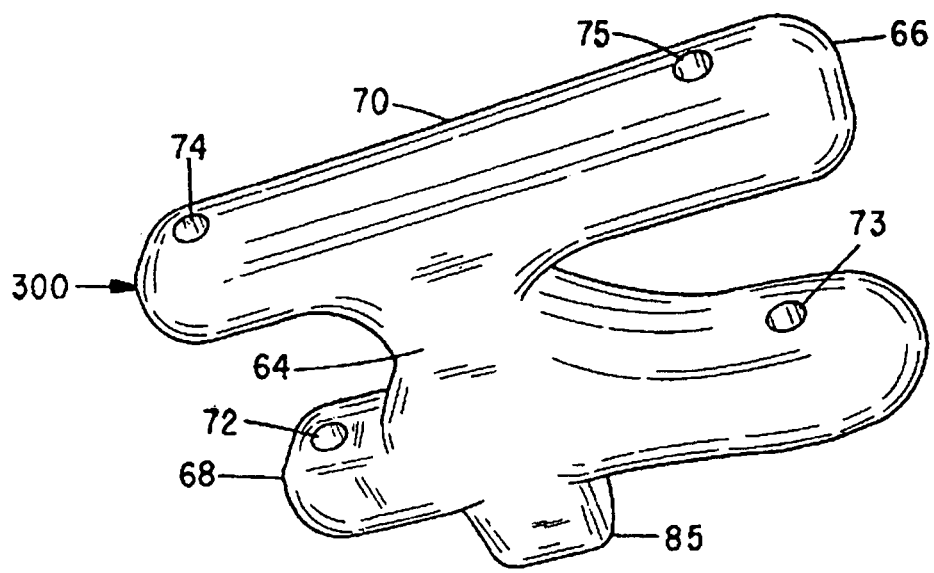
FIG. 17 shows a perspective view of the rear and top surfaces of a counter-rotating clevis similar to that of FIGS. 1-3 that exhibits a generally "H-shaped" molded body piece and wherein the distal end of the right-side cross arm piece exhibits a wider thickness than the remainder of the molded body.
Figure 18:
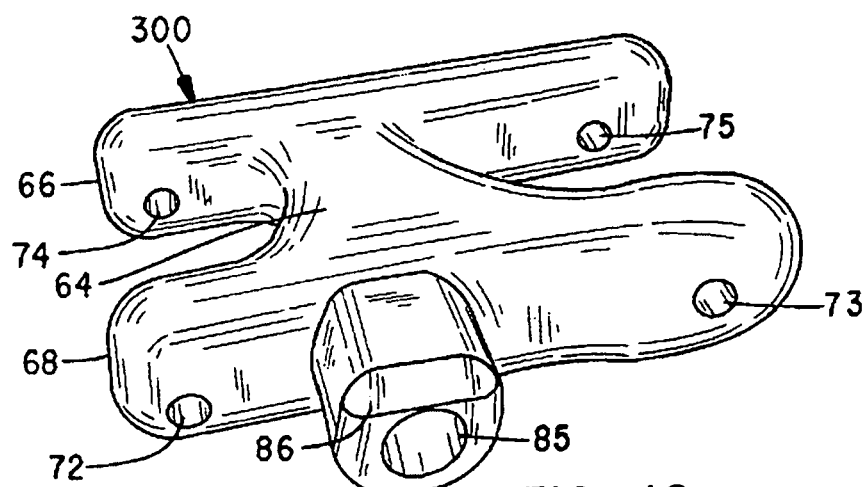
FIG. 18 shows a perspective view of the front side and bottom of the counter-rotating clevis of FIG. 17 and wherein the distal end of the right-side cross arm piece exhibits a wider width than the remainder of the molded body.
Figure 19:
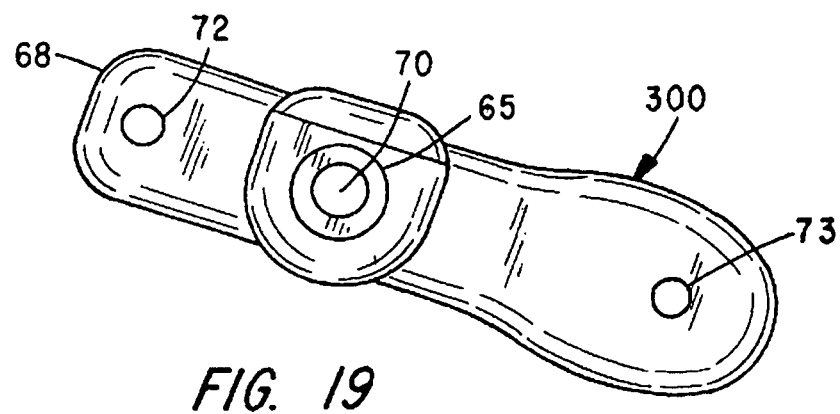
FIG. 19 shows a view of the bottom surface of the counter-rotating clevis of FIG. 17 and wherein the distal end of the right-side cross arm piece exhibits a wider thickness than the remainder of the molded body.

Appreciating the foregoing discussion regarding the end portions of the fore and aft lateral cross arms 66 and 68, FIGS. 17 through 19 depict a modified molded clevis body 300 similar to the molded clevis body 62. FIG. 17 particularly shows a perspective view of the rear and top surfaces of the molded clevis body piece 300 and wherein the distal end B of the aft right-side cross arm piece 68 exhibits a wider thickness than the remainder of the molded body (i.e. core 64, forward cross arm 66, and left side of the aft cross arm 68).

FIG. 18 shows a perspective view of the front and bottom surfaces of the counter-rotating molded clevis body 300 and wherein the wider thickness of the distal end B of the right-side cross arm piece 68 is more apparent. The bottom view of the aft cross arm 68 shown at FIG. 19 particularly exhibits the wider thickness of the distal end B of the long right-side cross arm piece 68 relative to the other body portions. The wider thickness of the distal end of the long right-side aft cross arm 68 particularly allows a smoother transition of a spinner blade 22 mounted to the spinner blade support arm 80 to prevent the spinner blade 22 from locking up. The enhanced thickness also increases the disruption of the surrounding water flow to facilitate the cyclical counter rotation that is desired.

While the invention has been described with respect to a presently preferred assembly and considered improvements, modifications and/or alternatives thereto, still other assemblies and arrangements may be suggested to those skilled in the art. It is therefore to be appreciated that the features of the foregoing clevises and lures can be arranged in different combinations to accommodate a variety of differing constructions. The foregoing description should therefore be construed to include all those embodiments within the spirit and scope of the following claims.

What is claimed is:

1. A fishing lure including a filamentary support and a fish hook and adapted to be drawn through water and further comprising:
   a) a clevis body comprising a linear core portion having a longitudinal through bore through which said filamentary support extends and a cross arm portion having longitudinally displaced forward and aft cross arm pieces that orthogonally radiate from said linear core portion in parallel relation to each other and wherein each of said forward and aft cross arm pieces includes a bore at a distal end;
   b) a linear support arm laterally displaced from said linear core portion and mounting in the bores of said forward and aft cross arm pieces to extend parallel with said linear core portion;
   c) a spinner blade having a bore and wherein said linear support arm extends through the spinner blade bore to support said spinner blade to freely move adjacent to said linear core portion along said linear support arm; and
   d) wherein said clevis body and said spinner blade when uninterruptedly drawn through water rotate about said filamentary support and self-induce hydrodynamic forces causing periodic cyclical changes of rotation of said clevis body and said spinner blade between clockwise and counter clockwise rotation.

2. The fishing lure as set forth in claim 1 wherein:
   a) said forward and aft cross arm pieces each comprise left and right segments that orthogonally radiate from left and right sides of said linear core portion and each of said left and right segments includes a bore at a distal end;
   b) said linear support arm comprises first and second linear support arms extending in parallel relation to each other and to said linear core portion in left and right gap spaces respectively separating the left and right segments of said forward and aft cross arm pieces and respectively mounting in the bores of the left and right segments of said forward and aft cross arm pieces; and
   c) said spinner blade comprises first and second spinner blades and each includes a bore through which said linear first and second support arms respectively extend to support said first and second spinner blades.

3. The fishing lure as set forth in claim 2 wherein the longitudinal separation of the left gap space is greater than the longitudinal separation of the right gap space.

4. The fishing lure as set forth in claim 2 wherein the left gap space is longitudinally offset along said linear core portion from the right gap space.

5. The fishing lure as set forth in claim 2 wherein the lateral displacement of the first linear support arm from the linear core portion is greater than the lateral displacement of the second linear support arm from the linear core portion.

6. The fishing lure as set forth in claim 2 wherein said first and second linear support arms comprise a generally "U-shaped" member having left and right linear side arms and an interconnecting cross arm, wherein said left and right linear side arms respectively extend through the bores of said left and right segments of said forward and aft cross arm pieces, and wherein said interconnecting cross arm is mounted to said linear core portion.

7. The fishing lure as set forth in claim 2 wherein said left and right segments of said forward cross arm piece are axially rotated about said linear core portion to be non-coplanar with the left and right segments of said aft cross arm piece.

8. The fishing lure as set forth in claim 2 wherein said first and second spinner blades are selected from a group comprising Colorado, French, hatchet, Indiana, kidney, Oklahoma, regal, tomahawk, turtleback and willow blades.

9. The fishing lure as set forth in claim 1 wherein said clevis body exhibits a generally "H-shape" and includes a linear core piece and longitudinally displaced forward and aft cross arm pieces that laterally radiate from distal ends of said linear core piece, wherein the longitudinal through bore extends through said linear core piece, wherein said forward and aft cross arm pieces each comprise left and right segments that radiate from opposite sides of said linear core portion and each includes a bore at a distal end, wherein said linear support arm comprises first and second linear support arms that extend parallel to said linear core piece in left and right gap spaces respectively separating the left and right segments of said forward and aft cross arm pieces, wherein said spinner blade comprises first and second spinner blades and each having a bore, wherein said first and second support arms respectively extend through the bores of said first and second spinner blades and mount in the bores of said left and right segments of said forward and aft cross arm pieces.

10. A fishing lure adapted to be drawn through water comprising:
   a) a fishing hook mounted to a filamentary support member;
   b) a clevis body piece having a linear core portion including a longitudinal through bore and through which said filamentary support member extends and a cross arm portion that orthogonally radiates from said linear core portion;
   c) a support arm mounted to a channel at a distal end of said cross arm portion and to said linear core portion and having a linear portion laterally displaced from said linear core portion that extends parallel to said linear core portion;

d) a spinner blade having a bore through which said linear portion of said support arm extends and that supports said spinner blade to freely move along said linear portion and adjacent to said linear core portion; and e) wherein said clevis body piece and said spinner blade when uninterruptedly drawn through water rotate about said filamentary support member and self-induce hydrodynamic forces causing periodic cyclical changes of rotation of said clevis body piece and said spinner blade between clockwise and counter clockwise rotation.

11. The fishing lure as set forth in claim 10 wherein said cross arm portion comprises longitudinally displaced forward and aft cross arm pieces that orthogonally radiate from said linear core portion in parallel relation to each other, and wherein said forward and aft cross arm pieces each comprise left and right segments that radiate from opposite sides of said linear core portion and each includes a bore at a distal end, wherein left and right gap spaces respectively separate the left and right segments of the forward and aft cross arm pieces, wherein said support arm comprises first and second linear support pieces that extend parallel to said linear core portion in said left and right gap spaces and mount in the bores of said left and right segments of the forward and aft cross arm pieces, and wherein said spinner blade comprises first and second spinner blades that each have a bore through which said first and second linear support pieces respectively extend.

12. The fishing lure as set forth in claim 11 wherein said left and right segments of said forward cross arm piece are axially rotated about said linear core portion to be non-coplanar with the left and right segments of said aft cross arm piece.

13. The fishing lure as set forth in claim 11 wherein the left gap space is longitudinally offset from the right gap space along said linear core portion and wherein the lateral displacement of the left forward and aft cross arm segments from the linear core portion is greater than the lateral displacement of the right forward and aft cross arm segments from the linear core portion.

14. A fishing clevis adapted to mount to a filamentary support member of a fishing lure comprising:

a) a body having a linear core piece and forward and aft cross arm pieces longitudinally displaced from each other and orthogonally radiating in parallel with each other along said linear core piece, wherein said forward and aft cross arm pieces respectively each comprise left and right segments radiating from opposite sides of said linear core piece and each includes a bore at a distal end, and wherein a longitudinal bore extends through said linear core piece and is adapted to receive said filamentary member;

b) first and second linear support arms laterally displaced on opposite sides from said linear core piece and extending in parallel with each other between the bores of said respective left and right segments of said forward and aft cross arm pieces in left and right gap spaces respectively separating the left and right segments of said forward and aft cross arm pieces;

c) first and second spinner blades each having a bore through which said first and second linear support arms respectively extend to support said first and second spinner blades to freely move in the left and right gap spaces; and d) wherein said body and said first and second spinner blades when uninterruptedly drawn through water rotate about said filamentary support and self-induce hydrodynamic forces causing periodic cyclical changes of rotation of said body and said spinner blade between clockwise and counter clockwise rotation.

15. The fishing clevis as set forth in claim 14 wherein the longitudinal separation of the left gap space is greater than the right gap space.

16. The fishing clevis as set forth in claim 14 wherein the left gap space is longitudinally offset along said linear core piece from the right gap space.

17. The fishing clevis as set forth in claim 14 wherein the radial displacement of the left segments of said forward and aft cross arm pieces from the linear core piece is greater than the radial displacement of the right segments of said forward and aft cross arm pieces.

18. The fishing clevis as set forth in claim 14 wherein said first and second linear support arms comprise a generally "U-shaped" member having left and right linear side arms and an interconnecting cross arm, wherein said left and right linear side arms respectively extend in parallel and mount in the distal end bores of said left and right segments of said forward and aft cross arms pieces, and wherein said interconnecting cross arm is mounted to said linear core piece.

19. The fishing clevis as set forth in claim 14 wherein said left and right segments of said forward cross arm piece are axially rotated about said linear core piece to be non-coplanar with the left and right segments of said aft cross arm piece.

20. The fishing clevis as set forth in claim 14 wherein said first and second spinner blades are selected from a group comprising Colorado, French, hatchet, Indiana, kidney, Oklahoma, regal, tomahawk, turtleback and willow blades.

* * * * *